US009285578B2

(12) United States Patent
Staker et al.

(10) Patent No.: US 9,285,578 B2
(45) Date of Patent: *Mar. 15, 2016

(54) METHOD FOR IMAGING HIGH DENSITY BIOCHEMICAL ARRAYS WITH SUB-PIXEL ALIGNMENT

(71) Applicant: Complete Genomics, Inc., Mountain View, CA (US)

(72) Inventors: Bryan P. Staker, San Ramon, CA (US); Craig E. Uhrich, Redwood City, CA (US)

(73) Assignee: Complete Genomics, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,979

(22) Filed: Jan. 12, 2015

(65) Prior Publication Data

US 2015/0160451 A1 Jun. 11, 2015

Related U.S. Application Data

(63) Continuation of application No. 14/184,473, filed on Feb. 19, 2014, now Pat. No. 8,965,196, which is a continuation of application No. 13/856,369, filed on Apr. 3, 2013, now Pat. No. 8,660,421, which is a (Continued)

(51) Int. Cl.
*G02B 21/36* (2006.01)
*H04N 7/18* (2006.01)
*G01B 11/27* (2006.01)
*G02B 21/00* (2006.01)

(Continued)

(52) U.S. Cl.
CPC ............ *G02B 21/365* (2013.01); *G01B 11/272* (2013.01); *G02B 21/002* (2013.01); *G02B 21/025* (2013.01); *G02B 21/361* (2013.01); *H04N 7/18* (2013.01); *H04N 5/37206* (2013.01)

(58) Field of Classification Search
CPC ... G01B 11/272; G02B 21/361; G02B 21/002
See application file for complete search history.

(56) References Cited

U.S. PATENT DOCUMENTS 3,706,848 A * 12/1972 Rouet ........................... 348/369
4,174,159 A * 11/1979 Kraft et al. .................... 396/432
4,302,087 A * 11/1981 Reinheimer et al. .......... 396/432

(Continued)

FOREIGN PATENT DOCUMENTS

WO        2012/058014 A1      5/2012

OTHER PUBLICATIONS

International Search Report and Written Opinion for PCT Patent Application No. PCT/US2011/56211 mailed on Apr. 17, 2012, 11 pages.

(Continued)

*Primary Examiner* — W B Perkey
(74) *Attorney, Agent, or Firm* — Kilpatrick Townsend & Stockton LLP; Kenneth R. Allen

(57) ABSTRACT

A method and associated system for imaging high density biochemical arrays comprises one or more imaging channels that share a common objective lens and a corresponding one or more time delay integration-type imaging cameras with optical alignment mechanisms that permit independent inter-channel and intra-channel adjustment of each of four degrees: X, Y, rotation and scale. The imaging channels are configured to independently examine different spectra of the image of the biochemical arrays.

8 Claims, 10 Drawing Sheets

Related U.S. Application Data continuation of application No. 13/451,678, filed on Apr. 20, 2012, now Pat. No. 8,428,454, which is a continuation of application No. 12/912,641, filed on Oct. 26, 2010, now Pat. No. 8,175,452.

(51) Int. Cl.
 *G02B 21/02* (2006.01)
 *H04N 5/372* (2011.01)

(56) References Cited

U.S. PATENT DOCUMENTS

| | | | | |
|---|---|---|---|---|
| 4,589,140 | A * | 5/1986 | Bishop et al. | 382/148 |
| 4,731,745 | A * | 3/1988 | Katagiri et al. | 348/141 |
| 5,969,800 | A * | 10/1999 | Makinouchi | 355/53 |
| 6,310,710 | B1 * | 10/2001 | Shahar et al. | 359/210.1 |
| 6,400,487 | B1 * | 6/2002 | Harris et al. | 359/210.1 |
| 6,753,906 | B2 * | 6/2004 | Shimada | 348/219.1 |
| 6,891,610 | B2 | 5/2005 | Nikoonahad et al. | |
| 7,113,502 | B2 * | 9/2006 | Oz et al. | 370/352 |
| 7,586,682 | B2 * | 9/2009 | Ohtake et al. | 359/557 |
| 7,714,996 | B2 | 5/2010 | Yan et al. | |
| 7,929,857 | B2 * | 4/2011 | Baldwin et al. | 396/432 |
| 8,059,336 | B2 * | 11/2011 | Ptitsyn et al. | 359/368 |
| 8,175,452 | B1 * | 5/2012 | Staker et al. | 396/532 |
| 8,203,608 | B2 | 6/2012 | Ziegenbein et al. | |
| 8,428,454 | B2 * | 4/2013 | Staker et al. | 396/532 |
| 8,660,421 | B2 * | 2/2014 | Staker et al. | 396/432 |
| 8,965,196 | B2 * | 2/2015 | Staker et al. | 396/432 |
| 2005/0280714 | A1 * | 12/2005 | Freeman | 348/219.1 |
| 2006/0061680 | A1 * | 3/2006 | Madhavan et al. | 348/370 |
| 2007/0147673 | A1 * | 6/2007 | Crandall | 382/128 |
| 2009/0072171 | A1 | 3/2009 | So et al. | |
| 2009/0295963 | A1 * | 12/2009 | Bamford et al. | 348/302 |
| 2010/0090127 | A1 * | 4/2010 | Yekta et al. | 250/459.1 |

OTHER PUBLICATIONS

International Preliminary Report on Patentability for PCT Patent Application No. PCT/US2011/56211 mailed on Feb. 18, 2014, 6 pages.

* cited by examiner

METHOD FOR IMAGING HIGH DENSITY BIOCHEMICAL ARRAYS WITH SUB-PIXEL ALIGNMENT

CROSS-REFERENCES TO RELATED APPLICATIONS

The present application is a continuation of U.S. application Ser. No. 14/184,473, filed on Feb. 19, 2014, titled "Method and System for Imaging High Density Biochemical Arrays with Sub-Pixel Alignment," which is a continuation of U.S. application Ser. No. 13/856,369, filed on Apr. 3, 2013, titled "Method and System for Imaging High Density Biochemical Arrays with Sub-Pixel Alignment," now U.S. Pat. No. 8,660,421 which is a continuation of U.S. application Ser. No. 13/451,678, filed on Apr. 20, 2012, titled "Method and System for Imaging High Density Biochemical Arrays with Sub-Pixel Alignment," now U.S. Pat. No. 8,428,454, which is a continuation of U.S. application Ser. No. 12/912,641, filed on Oct. 26, 2010, titled "Method and System for Imaging High Density Biochemical Arrays with Sub-Pixel Alignment," now U.S. Pat. No. 8,175,452, the contents of which are incorporated herein by reference in their entirety.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The disclosure is generally related to the field of imaging systems for high-density biochemical arrays.

High-density biochemical arrays and associated machines allow multiple biochemical experiments, sometimes billions, to be performed in parallel. This ability accrues from the development of techniques to perform each experiment in a very small volume and to pack the experiments very close together. To observe the experiments efficiently, advances analogous to miniaturization advances in other high technology industries are needed. Specifically, what is needed are fast, accurate, repeatable and robust imaging techniques for biochemical arrays.

SUMMARY

According to the invention, a system and associated method for imaging high density biochemical arrays comprises one or more imaging channels that share a common objective lens and a corresponding one or more time delay integration-type imaging cameras with optical alignment mechanisms that permit independent inter-channel and intra-channel adjustment of each of four degrees of freedom: X, Y, rotation and scale. The imaging channels are configured to independently examine different wavelengths in the image of the biochemical arrays.

The invention will be better understood by reference to the following detailed description in connection with the accompanying drawings.

DETAILED DESCRIPTION

Human genome studies and other uses of biochemical arrays require advanced imaging systems to achieve commercially viable data acquisition rates. The number of biochemical experiments from which data may be collected per unit time depends on array density and image acquisition speed among other factors. Increased array density complicates the image acquisition problem because it makes keeping track of the identity of each experiment (out of millions) in an image challenging.

For DNA arrays the desired data are usually quaternary; a nucleotide may be A, C, G or T. These possibilities are labeled with a set of four different colored fluorescent molecular tags. Each fluorescent tag absorbs light of a certain wavelength and emits light of a longer wavelength. A multichannel imager collects data in as many of the four possible wavelength bins as possible simultaneously.

Figure 1A:
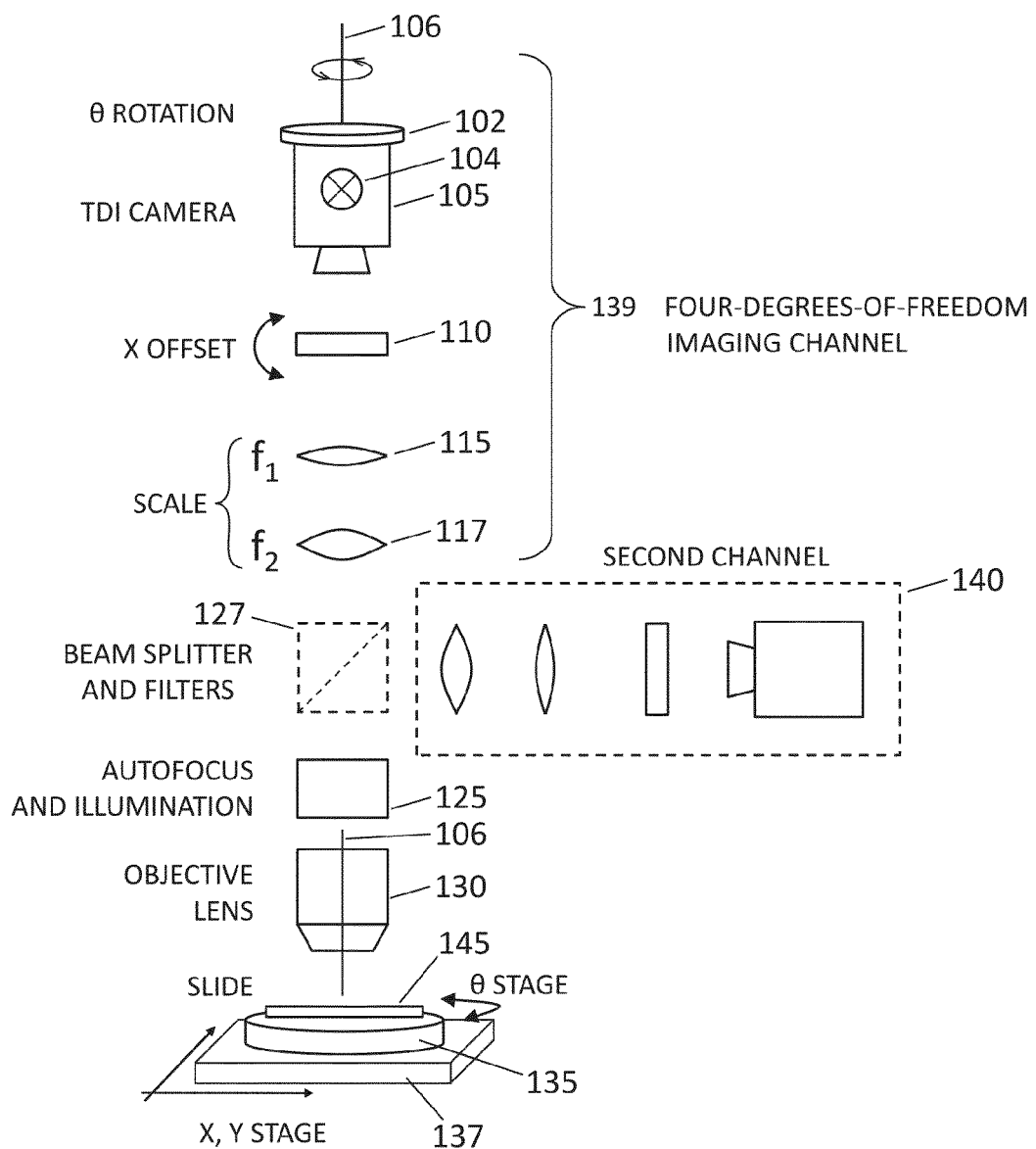
FIG. 1A is a diagram of a first multichannel biochemical array imaging system.
Figure 1B:
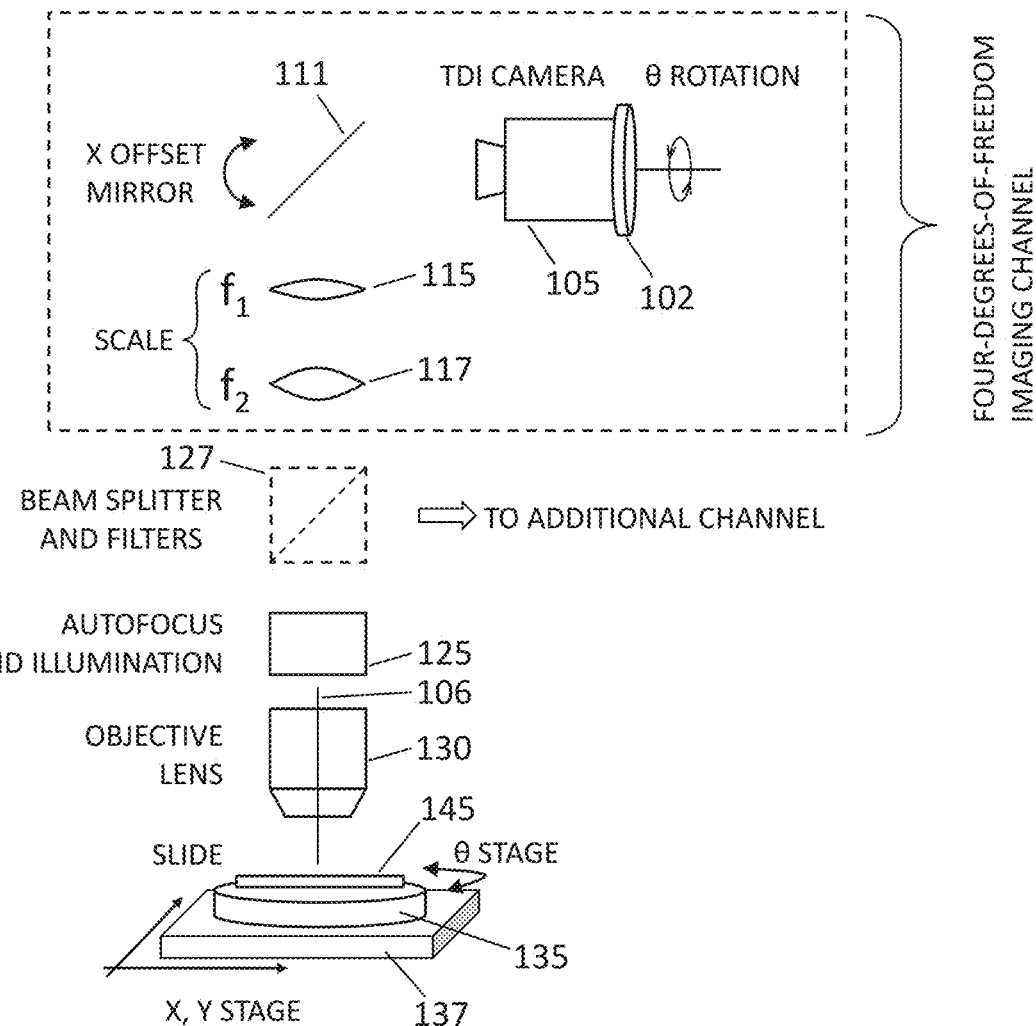
FIG. 1B is a diagram of a second multichannel biochemical array imaging system.
Figure 1C:
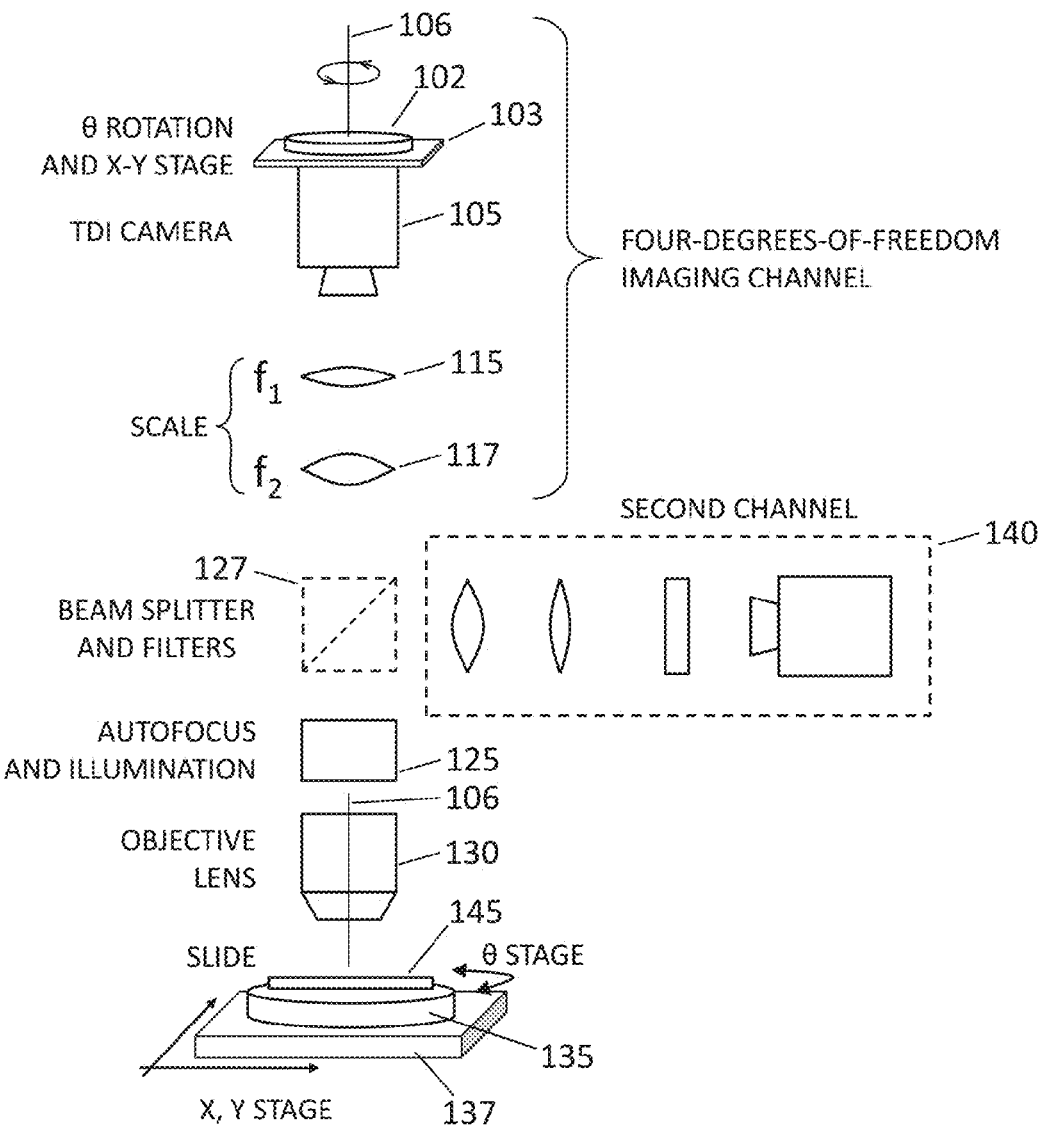
FIG. 1C is a diagram of a third multichannel biochemical array imaging system.
Figure 1D:
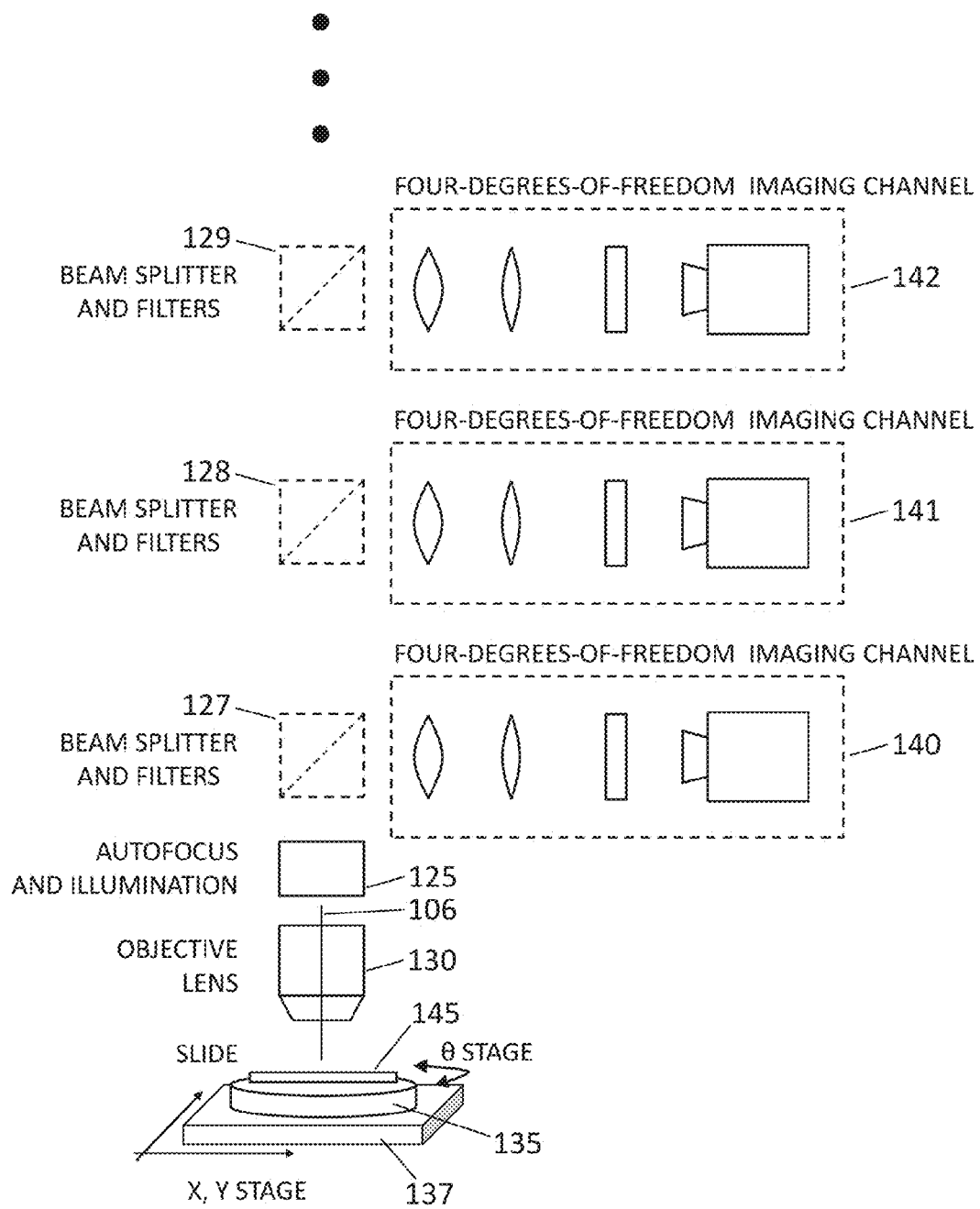
FIG. 1D is a diagram of a fourth multichannel biochemical array imaging system.

FIGS. 1A-1D are diagrams of multichannel biochemical array imaging systems. Each imaging channel in these multichannel systems has its own independent adjustments for image rotation, x and y offset, and scale (magnification), as hereinafter explained as intrachannel and interchannel adjustment independence. FIG. 1A illustrates a two-channel system. FIGS. 1B and 1C illustrate the system of FIG. 1A with alternate means of adjusting x and y image offset. FIG. 1D illustrates how multiple four-degrees-of-freedom imaging channels may be added to a multichannel system.

The system of FIG. 1A has two simultaneous imaging channels each with four degrees of freedom for image adjustments: rotation, x and y offset, and scale or magnification. A high precision positioning stage scans a slide under a microscope objective lens that is characterized by an axis of rotational symmetry.

In FIG. 1A, conventional time delay integration (TDI) camera 105 is mounted on rotation stage 102. Camera 105 may operate in TDI mode or full frame mode depending on what operations the system is performing. Lateral offset plate 110 shifts the position of an image in camera 105. Tube lens 117 and helper lens 115 together form a zoom lens system for focusing and changing the size of an image in camera 105. The rotation stage 102 is configured to rotate the TDI camera 105 around a common axis of rotational symmetry 106 to orient the internal CCD array (not shown) of the TDI camera 105 with respect to a sample 145 so that that the sample 145 can be properly scanned along a scanning axis 104 (through the plane of the figure). The camera 105, the rotation stage 102, the plate 110 and the zoom lens system formed of tube lens 117 and helper lens 115 together form one independent imaging channel 139. A second independent imaging channel 140 comprises a second camera mounted on a rotation stage, an offset plate and a zoom lens system. Beam splitter and filter assembly 127 directs different wavelengths of light to the different imaging channels 139, 140. Only one beam splitter/filter assembly 127 is shown in FIG. 1A. However, in other embodiments of the system, additional beam splitters and/or filters may be moved in and out of the machine system by mechanical robots. Autofocus and illumination systems are represented by block 125. Microscope objective 130 common to all imaging channels is focused on a sample 145 in the form of a biochemical array slide that is mounted on a positioning stage comprising rotation stage 135 and X-Y stage 137.

Light emitted by fluorescently tagged biomolecules is collected by the microscope objective and focused onto pixels in one or the other of the TDI cameras, depending on wavelength. A system with two imaging channels can record image data in two wavelength bins simultaneously. Substitution of different dichroic or polychroic beam splitters and/or filters 127 allows image data to be collected in additional wavelength "bins." Each imaging channel has its own zoom lens system to adjust image focus and magnification. Such adjustments are typically made when changing dichroic filters, for example. Each camera may be independently rotated and the array slide may also be rotated on top of its X-Y positioning system.

The zoom system is atypical in that it provides a constrained and very limited range of magnification (scale) adjustment, but does so with very high precision and stability. Lenses 115 and 117 are mounted on precision stages (not shown) that move them along the lens axes in one micron steps. In an example system the focal lengths $f_1$ and $f_2$ are about 500 mm and 165 mm, respectively with the maximum change in scale not exceeding 3%. This precise zoom system allows the magnification of a nominally 16× microscope to be adjusted in steps as small as approximately 0.00009× while maintaining focus.

FIG. 1B shows a variation of the system of FIG. 1A. In FIG. 1B mirror 111 replaces offset plate 110 of FIG. 1A. The mirror provides an alternate means of offsetting an image in camera 105. Second imaging channel 140 is not shown in FIG. 1B for clarity of illustration.

FIG. 1C shows a variation of the systems of FIGS. 1A and 1B. In FIG. 1C camera 105 is mounted on x-y positioning stage 103 as well as rotation stage 102. Neither an offset plate (e.g. 110 of FIG. 1A), nor an offset mirror (e.g. 111 of FIG. 1B) are included in one of the channels of the system of FIG. 1C. Rather, mechanical x-y positioning stage 103 provides lateral offset control for camera 105.

FIG. 1D shows how systems like those illustrated in FIGS. 1A-1C may be constructed with any number of imaging channels, each with parameters adjustable independently of one another and each channel being adjustable independently of any other channel so that adjustments in one channel have no effect on other channels. This intrachannel and interchannel adjustment independence is herein denoted as four-degrees-of-freedom imaging channel independence. In FIG. 1D beam splitter/filter assemblies 128 and 129 direct different wavelengths of light to imaging channels 141 and 142 respectively. Each imaging channel may contain independent adjustments for image rotation, x and y offset, and scale or magnification. X and y offset control may be achieved with tilting plates (e.g. plate 110), mirrors (e.g. mirror 111), time delay integration pulse timing (as described below) or a combination of techniques. The lateral offset plate is described in more detail in connection with FIG. 2.

Figure 2:
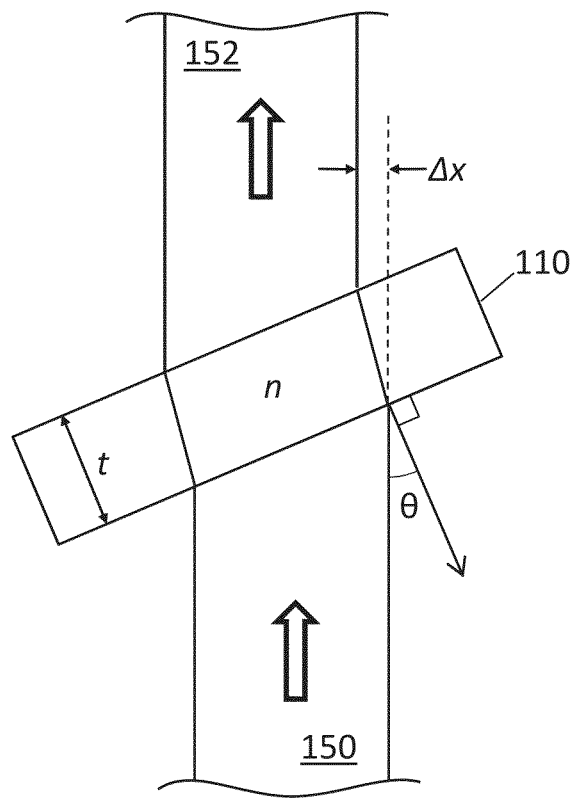
FIG. 2 is a diagram of lateral offset plate.

FIG. 2 is a diagram of lateral offset plate 110. Plate 110 shifts the position of images in camera 105. In FIG. 2 light beam 150 is shown passing through plate 110 and emerging as light beam 152. Because the beam passes through the plate at non-normal incidence, its position is offset by an amount $\Delta x$ given by:

$$\Delta x = t\sin\theta - \frac{t}{n} \frac{\cos\theta \sin\theta}{\sqrt{1 - \left(\frac{1}{n}\sin\theta\right)^2}}$$

where t is the thickness of the plate, n is its index of refraction and $\theta$ is the angle of incidence. A typical glass (n~1.5) plate that is approximately 2.5 cm in diameter and 3.5 mm thick weighs only a few grams and may be mounted on a galvo rotation mechanism for quick and precise movements. A five degree tilt produces an offset of about 100 μm.

Figure 3:
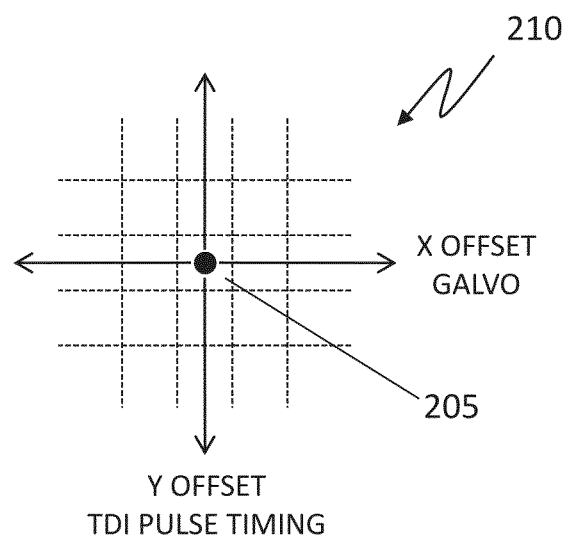
FIG. 3 illustrates X and Y offsets.

Images may be shifted in the perpendicular (i.e. Y) direction relative to the X axis through the use of time delay integration (TDI) pulse timing in camera 105. FIG. 3 illustrates X and Y offsets. Spot 205 is a spot of light imaged on an array of pixels 210. Arrows indicate how the spot may be moved with respect to the pixel array. As described above, X offsets are adjusted by a galvo and offset plate system, while Y offsets are adjusted by TDI pulse timing. In time delay integration, an image is scanned across pixels in a camera at (nominally) the same rate that image data is read out of the pixels. Slight changes in the data read-out rate (or scan rate, or both) in effect shift the position of recorded images along a first axis, while slight changes in the angle of the galvo-controlled offset plate around the first axis can shift the position of recorded images along the axis normal to the first axis. Thus the combination of TDI cameras having adjustable timing and galvo-controlled offset plates offers a quick and precise way to introduce independent, two-dimensional, lateral offsets in images recorded by cameras in the imaging channels of a multichannel imaging system. Furthermore this method of introducing image offsets does not depend on moving a slide with respect to an objective lens.

Figure 4:
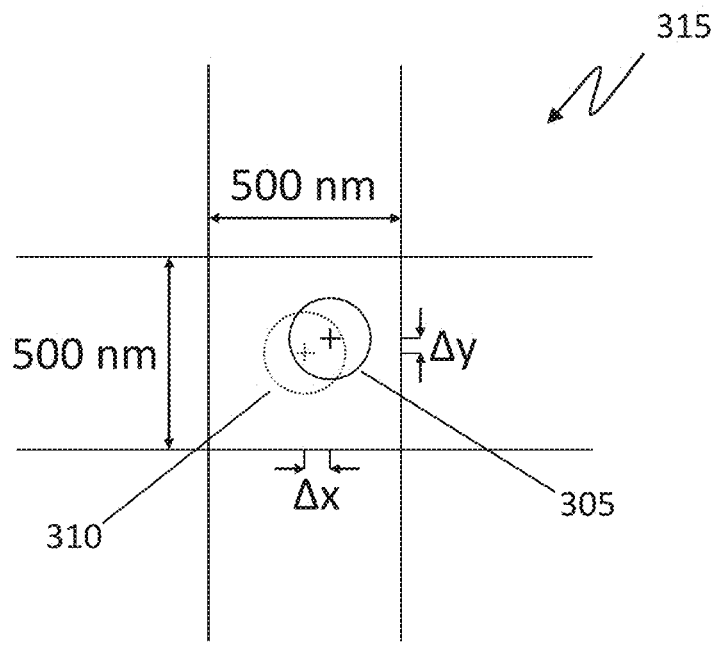
FIG. 4 illustrates X and Y alignment errors.

The galvo-controlled plate and TDI offset system just described are useful for making small corrections to align an image of a biochemical array with an array of pixels in a camera. (The control mechanism is beyond the scope of this disclosure.) FIG. 4 illustrates X and Y alignment errors between a spot 305 in an image and an array of pixels 315. In FIG. 3, dotted circle and plus sign symbol 310 denotes the center of a pixel. The symbol comprising a solid circle and plus sign 305 indicates the actual position of a spot in an image. "Δx" and "Δy" show the difference between positions 305 and 310. In one particular system, each 8 μm by 8 μm camera-based pixel images and thus corresponds to a 500 nm by 500 nm area of a biochemical array. It has been found that an imaging system such as the one illustrated in FIG. 1 can maintain alignment to a biochemical array with better than 20 nm accuracy while scanning more than one million data spots per second.

Achieving high throughput with high density arrays depends in part on accurate mechanical scanning stages. In principle X-Y stage 137 in FIG. 1 can move in any direction in the X-Y plane. Diagonal movement is created by a combination of X and Y movements. In practice, however, stage accuracy is best if one dimension (e.g. X) is fixed while movements in the other dimensions (e.g. Y) are taking place.

Figure 5:
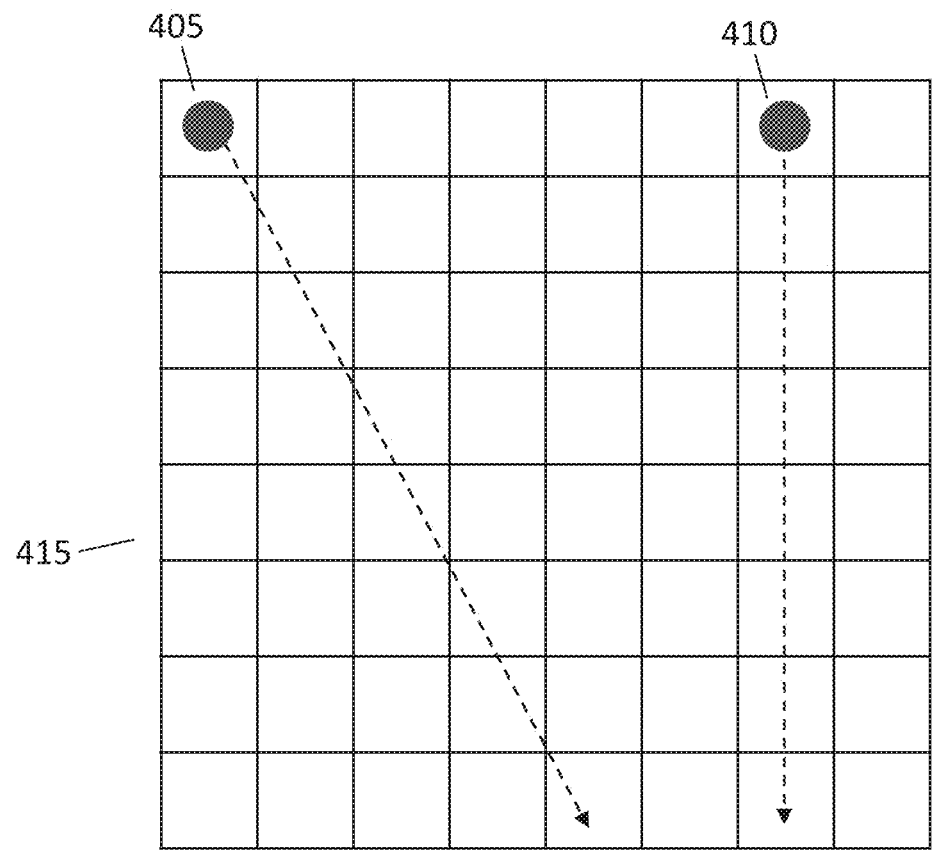
FIG. 5 is a conceptual diagram of imaging a spot with a pixel array using time delay integration.
Figure 6:
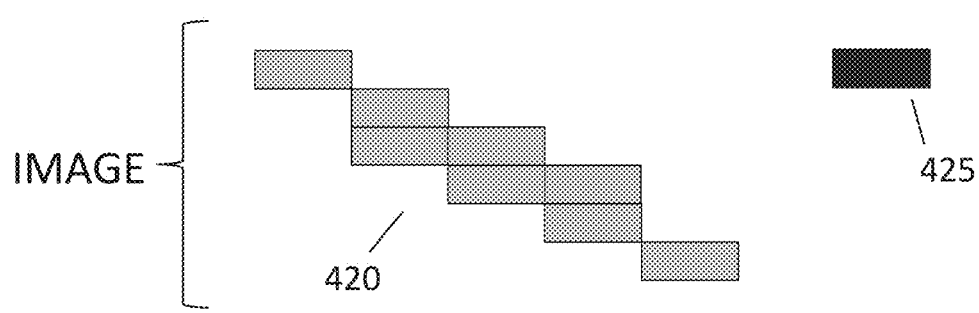
FIG. 6 is a conceptual diagram of results of the time delay integration imaging of FIG. 5.

Similarly, time delay integration cameras achieve highest precision when they are scanned parallel to the direction of data read-out. FIG. 5 is a conceptual diagram of imaging a spot with a pixel array using time delay integration. Misalignment causes image smearing as shown in FIG. 6 which is a conceptual diagram of results of the time delay integration imaging of FIG. 5.

Spot 405 is imaged by array of pixels 415. The relative motion of the spot and the pixel array is shown by the dotted arrow originating at spot 405. The arrow is not aligned with the pixel array and smeared image 420 is the unfortunate result. Spot 410 is also imaged by array of pixels 415, but this time the relative motion of the spot and the pixel array is shown by the dotted arrow originating at spot 410. The arrow is aligned with the pixel array and image 425 results.

Figure 7:
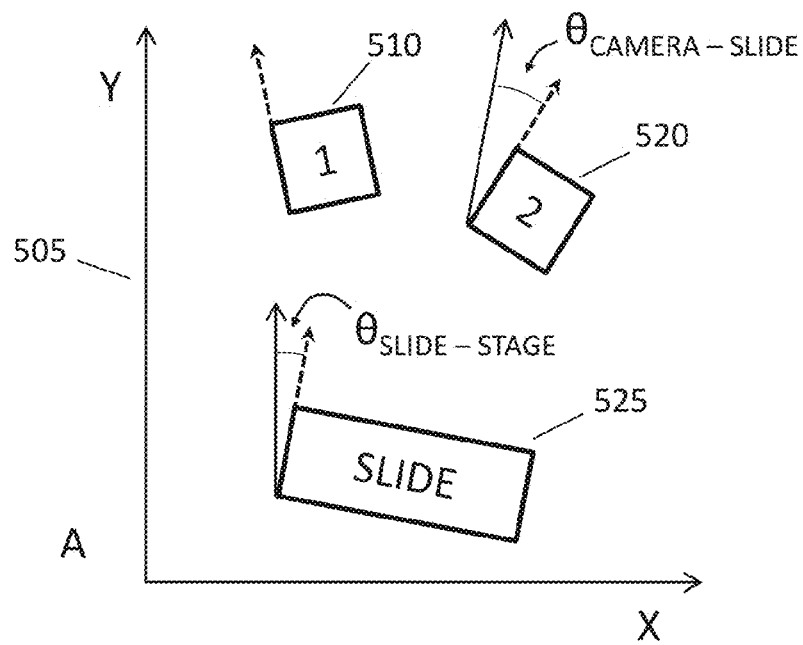
FIG. 7 shows rotational alignment relationships between two cameras, a slide and a positioning stage before alignment.
Figure 8:
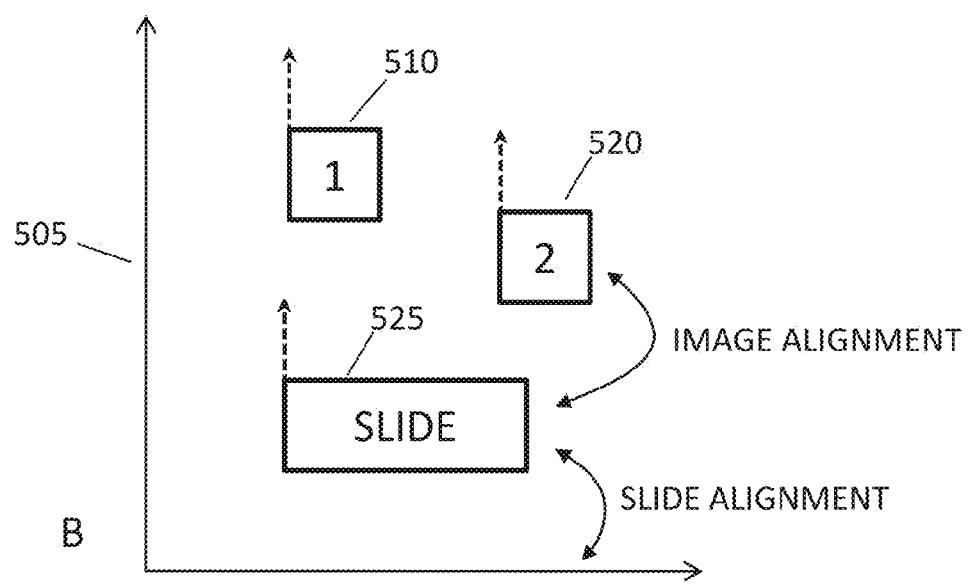
FIG. 8 shows rotational alignment relationships between two cameras, a slide and a positioning stage after alignment.

Practical limitations of positioning stages and camera time delay integration systems highlight the utility of providing each camera, and the slide X-Y stage, with rotation stages. FIGS. 7 and 8 show rotational alignment relationships between two cameras, a slide and a positioning stage. If one of these four elements is considered to be fixed, three degrees of rotational freedom are required to align the other three elements.

In FIGS. 7 and 8, X and Y axes 505 represent the orientation of a stage such as X-Y stage 137 in FIG. 1. The orientation of cameras in the first (e.g. camera 105 in FIG. 1) and second imaging channels are represented by 510 and 520 respectively. The orientation of a slide, such as slide 145 in FIG. 1, is represented by 525. In FIG. 7 the two cameras, the slide and the stage are all rotationally misaligned with respect to each other.

Aligning all of these elements as shown in FIG. 8 may be accomplished in a process that involves aligning the cameras 510, 520 to the slide 525 and aligning the slide 525 to the X-Y stage. An example of such a process is:

A. Take an image of an array of biochemical experiments on the slide using one of the cameras.
B. Calculate the angle, $\theta_{CAMERA-SLIDE}$, between the camera and the slide using image alignment procedures. Store this angle for later use.
C. Find the angle between the slide and the X-Y stage, $\theta_{SLIDE-STAGE}$, using slide alignment procedures described below.
D. Rotate the slide by the angle found in step (C) to align it with the X-Y stage axes.
E. Rotate the camera by the sum of the angles found in steps (B) and (C) to align it with the stage.
F. Repeat the slide alignment procedure of step (C) to obtain a new slide mapping.
G. Repeat steps (B) and (C) to confirm all angles equal to zero. If not, repeat entire process.
H. Repeat the entire process for the other cameras.

Figure 9:
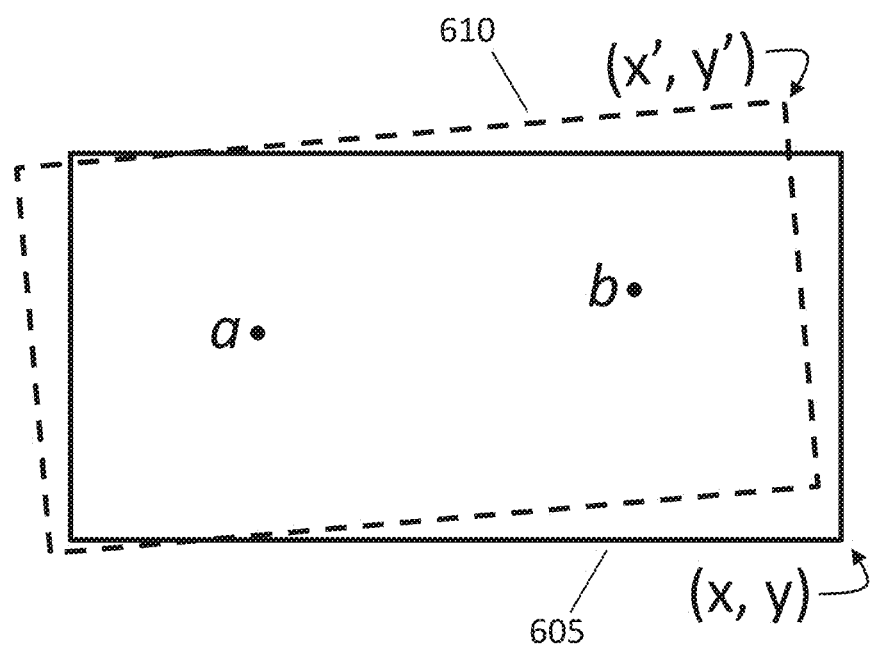
FIG. 9 illustrates reference frames used in slide alignment.

Alignment of the slide with the X-Y stage proceeds as described in connection with FIG. 9, which illustrates reference frames used in slide alignment. In FIG. 9, reference frame 605 is aligned with an X-Y stage such as X-Y stage 137 in FIG. 1. Reference frame 610 is aligned with a slide such as slide 145 in FIG. 1. The two reference frames may be rotated with respect to one another by a rotation stage such as rotation stage 135 in FIG. 1. In order to determine the required rotation angle (and offset and scale relationships), several points on the slide, such as points "a" and "b" in FIG. 9, are measured in each reference frame. The location (x, y) of a point in the stage reference frame is known from digital positioning commands issued to the stage. The location (x', y') of a point in the slide reference frame is determined during image alignment procedures. If N points, indexed by i=1 to N are measured in both reference frames, then for point i one may write:

$$x'_i = a_{00} + a_{10}x_i + a_{01}y_i + a_{20}x_i^2 + a_{11}x_iy_i + a_{02}y_i^2 + \ldots$$

$$y'_i = b_{00} + b_{10}x_i + b_{01}y_i + b_{20}x_i^2 + b_{11}x_iy_i + b_{02}y_i^2 + \ldots$$

The expansion above has been carried out up to second order. Expansions to higher order, or in other coordinate systems, etc., may be used without loss of generality. Next, an error term may be constructed:

$$\chi^2 = \left(\frac{1}{N}\right)\sum_{i=1}^{N} \{(x'_i - x_i)^2 + (y'_i - y_i)^2\}$$

Then, $\chi^2$ is minimized to find coefficients $a_{00}$, $a_{10}$, $a_{01}$, ..., $b_{00}$, $b_{10}$, $b_{01}$, ..., etc. Finally the angle between reference frames may be calculated from the coefficients.

Once cameras, slide and stage are aligned, data acquisition may begin. The imaging systems of FIG. 1 have both static and dynamic image adjustment capability. Static adjustments include magnification via zoom lens systems, rotation via a set of mechanical rotation stages, and wavelength selection via beam splitter and filter choices. Static adjustments are made before slide scanning operations begin, while dynamic adjustments can be made during a scanning operation.

Dynamic adjustments include small X and Y offset changes made via TDI pulse timing and galvo-driven rotation of a transparent flat plate, e.g., 110, rotation of a mirror, e.g., 111, or translation of a stage, e.g., 103. The dynamic adjustments may form part of an image-based control loop that corrects positioning error during scanning operations. The control loop involves acquiring images in cameras, clocking out image data from the cameras, analyzing the data, calculating error corrections and adjusting X and Y offsets via TDI pulse timing and galvo plate angle.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In the following claims, the terms used should not be construed to limit the systems and methods to the specific embodiments disclosed in the specification and the claims, but should be construed to include all systems that operate under the claims. Accordingly, the invention is not limited by the disclosure, except as indicated by the claims.

What is claimed is:

1. A method for aligning an imaging system having a microscope objective and a multichannel imager, the method comprising:
   (a) collecting light emitted from a sample on an x-y positioning stage;
   (b) obtaining an image of the sample along a rotational axis of symmetry of the microscope objective;
   (c) calculating a first angle between the multichannel imager and the sample around the rotational axis of symmetry;
   (d) calculating a second angle between the sample and the x-y positioning stage around the axis of rotational symmetry;
   (e) rotating the sample by the second angle to align the sample with the x-y positioning stage; and
   (f) rotating the multichannel imager by the sum of the first angle and the second angle to align the camera with the x-y positioning stage.

2. The method of claim 1, further comprising:
   (g) repeating steps (c) and (d) to determine whether either the first angle between the camera and the sample or the second angle between the sample and the x-y positioning stage is zero; and
   (h) repeating steps (a) through (g) if the first angle or the second angle is not zero.

3. The method of claim 1, further comprising:
   (g) performing a scanning operation to acquire image data of the sample in a plane normal to the axis of rotational symmetry.

4. The method of claim 3, wherein performing the scanning operation comprises:
   (h) correcting a positioning error during the scanning operation by using an image-based control loop.

5. The method of claim 3, wherein performing the scanning operation comprises:
   (h) making dynamic adjustments that include an X offset and a Y offset.

6. The method of claim 5, wherein making the dynamic adjustments comprises:
   (i) reading the image data from the camera;
   (j) calculating error corrections based on the image data;
   (k) based on the error corrections, calculating the X offset and the Y offset respectively for an X direction and a Y direction in the plane normal to the axis of rotational symmetry; and
   (l) applying the X offset and the Y offset prior to acquiring subsequent image data of the sample.

7. The method of claim 6, wherein applying the X offset comprises a member of the group consisting of:
   rotating an offset plate based on the X offset;
   rotating a mirror based on the X offset;
   translating the x-y positioning stage based on the X offset; and
   translating the x-y positioning stage based on the Y offset.

8. The method of claim 6, wherein the multichannel imager is a TDI camera, and wherein applying the Y offset comprises:
   (m) changing the pulse timing of the TDI camera based on the Y offset.

* * * * *